3,430,187
Patented Feb. 25, 1969

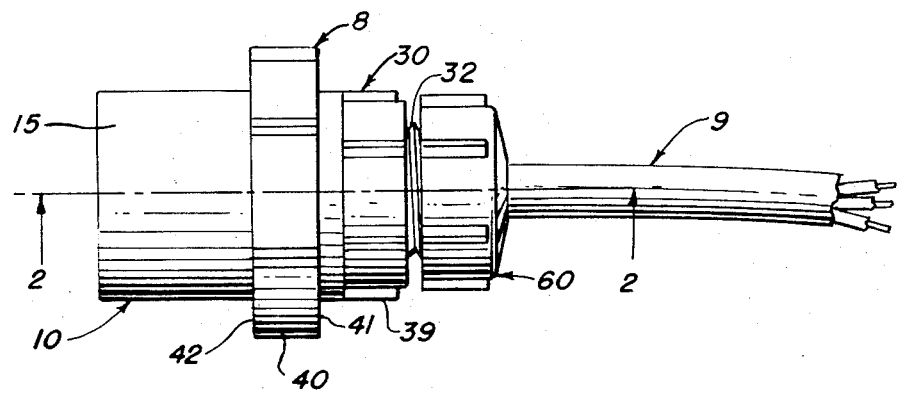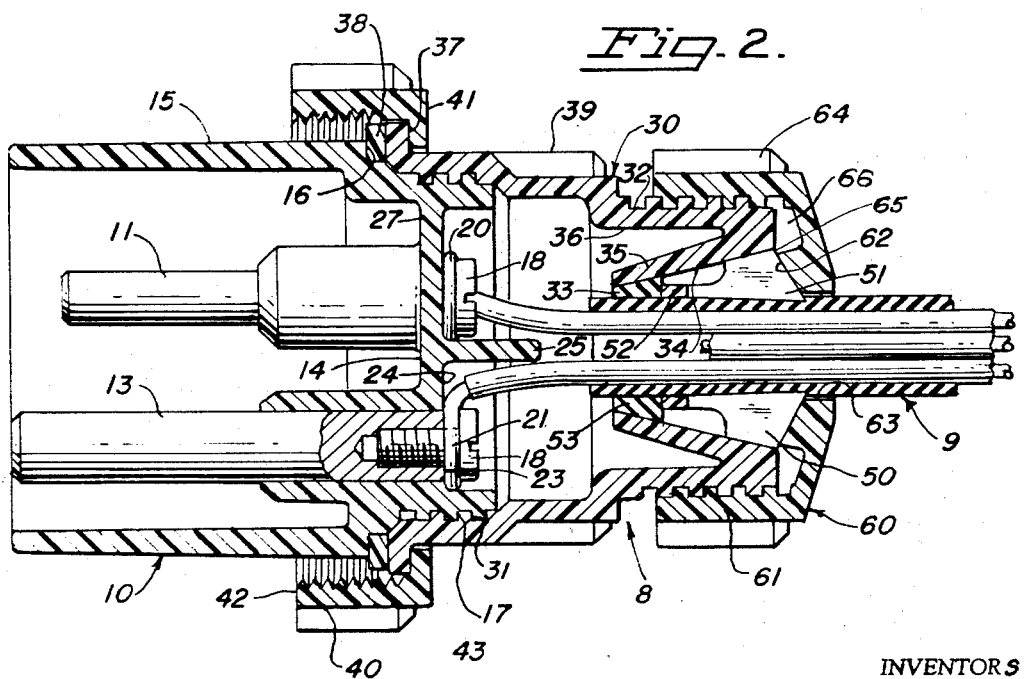

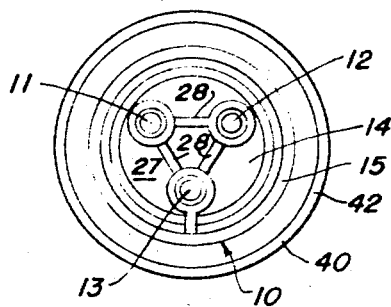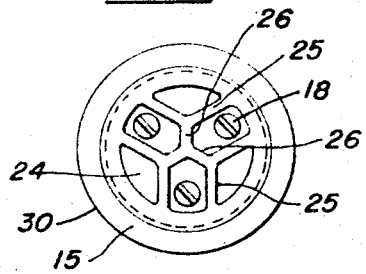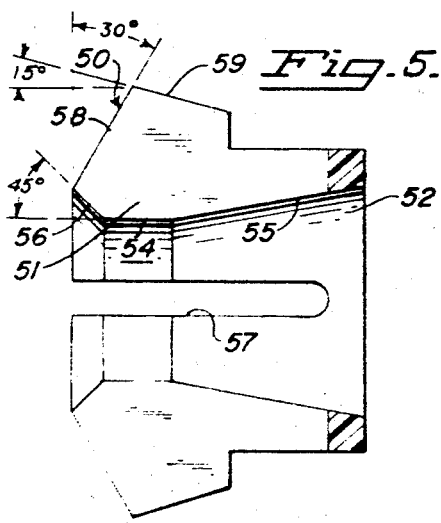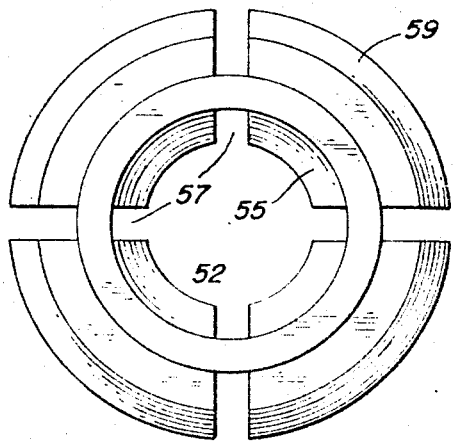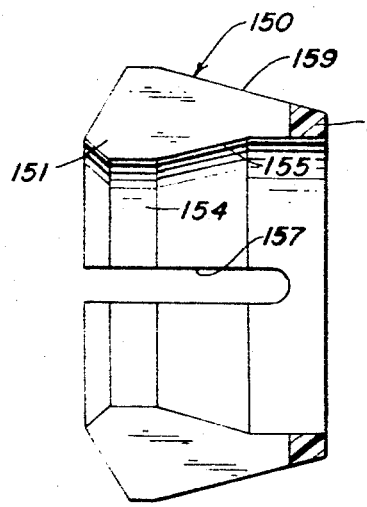

3,430,187
MARINE PLUG

Heiko T. de Man, 10 Sullivan Drive, Moraga, Calif. 94559; George G. Roberts, 447 Eleanor Drive, Woodside, Calif. 94062; and Henry Nakagawa, 358 Clifton Ave., San Carlos, Calif. 94070
Continuation-in-part of application Ser. No. 578,225, Sept. 9, 1966. This application Mar. 11, 1968, Ser. No. 712,119
U.S. Cl. 339—103    12 Claims
Int. Cl. H01r 13/58; F16g 11/02

ABSTRACT OF THE DISCLOSURE

A marine plug for use with an insulated cord and for engagement with a receptacle. A male member has metallic prongs embedded in a generally cylindrical plastic member having an annular shoulder between a depending cylindrical skirt and an upper extending threaded portion, with wire attachment means for said prongs. An intermediate plastic tubular member has a lower interiorly threaded portion for engagement with the threaded portion of the male member and an upper exteriorly threaded portion having an interior annular conical seat. A cord-grasping sleeve has an upper clinching portion and lower portion slightly larger than the size of the cord; the upper portion is molded to provide a short cylindrical bore much smaller in diameter than the core and joined to its upper end and to said lower portion by frusto-conical portions. The upper portion is divided by notches and has outer conical surfaces, one seated in said conical seat and having the same slope as it, the other an upper conical face. A resilient O-ring may be wedged between the sleeve and the intermediate member. A pressure cap is threaded on the intermediate member and has a conical surface having the same slope as it and pressing on the conical face, so that when the pressure cap is threaded tightly, it and the conical seat force the upper portion of the sleeve back into its as-molded shape biting into the cord and in very tight squeezing engagement with said cord, the O-ring being then forced into sealing engagement with the cord.

---

This application is a continuation-in-part of application Ser. No. 578,225, filed Sept. 9, 1966, now abandoned.

This invention relates to an improved marine plug and to a device for gripping the electric cord or other similar articles.

Marine plugs for electrical connections are known, and only those accepted by the United States Coast Guard are permitted aboard United States merchant ships, but heretofore there have been difficulties in providing adequate water sealing; for example, there have been problems because of the prongs being fitted loosely into the plug so that water could leak around the prongs, and Underwriters Laboratories, Inc., has stated that the conventional loosely fitted prongs do not meet its standards for receptacles and plugs. There has also been a problem in connecting the plug tightly enough to the cord to prevent water from leaking down the cord and thence into the plug. Also, if the connection does not grip the cord very firmly, it is unwise to handle the fixture by the cord, for the cord might then be pulled from the plug. (It is contrary to U.S.C.G. regulations for the terminal connections to bear any part of the strain.)

Another difficulty was that marine plugs have been dangerous, because they included metal conducting material which tended to result in short circuits to any person who touched them. In order to overcome this difficulty, three-wire systems have been used, and there has been a requirement that the plugs have a connection from a ground prong to their metal shell, but the grounding has not always been effective, and even when it was, it was inconvenient to have grounding as a requirement, because two-conductor cords were sometimes used to replace damaged three-conductor cords.

The present invention provides improved safety, improved water-tightness, improved cord retention regardless of differences in cord diameter (within limits) and improved convenience and helps to solve these problems. It enables elimination of the connection of the ground prong to the plug shell when used with a fixture having a non-conducting body. Part of its novelty lies in its preferably being substantially all of a strong insulating material; only the actual conducting portions are made from metal. Water sealing is obtained by molding the prongs right into the plastic and by using a cord-grasping sleeve.

An important feature of the invention is that firm seizure of the cord is also obtained by the use of a novel plug structure. The mechanism which accomplishes this excellent gripping is also applicable to other environments for gripping ropes, wire cable, armored cable, and other similar items, and is not limited to the marine industry.

Other objects and advantages of the invention will appear from the following description of a preferred embodiment.

In the drawings:

FIG. 1 is a view in side elevation of a marine plug embodying the principles of this invention, shown attached to a cord, the cord being broken off to save drawing space.

FIG. 2 is a view like FIG. 1 but with the plug in section, taken along the line 2—2 in FIG. 1.

FIG. 3 is a view in end elevation of the plug of FIGS. 1 and 2, looking from the left end thereof.

FIG. 4 is a view like FIG. 3 of the other end of the plug's male member.

FIG. 5 is an enlarged view in cross section of the novel cord-grasping sleeve shown in FIG. 2.

FIG. 6 is a view in end elevation looking from the right at FIG. 5.

FIG. 7 is a view similar to FIG. 5 of a modified form of sleeve.

A plug 8 is shown in the drawings as a specific embodiment of the invention, attached to an insulated conducting cord 9. The plug 8 is an assembly made up of a male member 10, an intermediate member 30, a gasket 38, a connection member 40, a cord-gripping sleeve 50, an O-ring 53, and a cap 60. All of these members are preferably made from strong, electrically insulating material, the only metal parts being the prongs and wire-attaching screws. Polycarbonate and nylon are suitable materials, except for the gasket 38 and the O-ring 53, which may be made from neoprene. The cord-gripping sleeve 50, the connection member 40, and the cap 60 are insulated from the live wiring and may, if desired, be made from metal though this is less desirable.

The male member 10 is a unitarily molded insulating member having metallic prongs 11, 12, and 13 embedded in it and molded into it and projecting out from an end wall 14 and surrounded by a generally cylindrical skirt 15. The wall 14 and skirt 15 are made solely from a suitable, insulating, strong, molded material, such as polycarbonate. An annular shoulder 16 on top of the skirt 15 leads to an upwardly extending exteriorly threaded portion 17, the threads preferably being of the acme type and left-hand, so that no locking screw is needed.

The embedded ends of the prongs 11, 12, and 13 are sealed into the non-conductive material of the end wall 14 and are provided with suitable wire attachment means, such as being recessed and threaded internally to receive screws 18, which force wires 20 and 21 of the cord 9 against contact portions 23. A three-wire grounding system may be used but is not necessary when the appliance to be used is also made from non-conductive material; the third prong 13 is then used as a guide and to fit the existing receptacle equipment. The rear surface 24 of the end wall 14 is provided with internal partitions 25 to provide walls isolating each prong and its wire from the others, the partitions 25 having a triangular higher portion 26 in the center. The forward surface 27 of the wall 14 has strengthening ribs 28 connecting the portions near the prongs.

The intermediate tubular member 30 has a lower interiorly threaded portion 31 for engagement with the threaded portion 17 of the male member 10 and also has an upper exteriorly threaded portion 32. Preferably the portions 31 and 17 have left-hand acme threads, while the portion 32 has right-hand acme threads. Inside the upper portion 32 is not only a central opening 33, but also a generally conical annular seat 34 molded to give a seating angle corresponding to the shape of the sleeve 50 soon to be described. The conical seat 34 may be made by molding the device to provide a conical projection 35 from a generally cylindrical interior wall 36. Near the threaded portion 31, the member 30 has a flange 37 which serves to compress a gasket 38 against the shoulder 16 to provide a completely water-tight joint there between members 10 and 30 and the receptacle (not shown) into which the male member 10 enters to make the desired electrical connection.

Since the plug 8 is intended to be attached to receptacles of the type having threaded skirts to render the connection watertight, the connection ring 40 is preferably provided, seated on the flange 37, having an annular upper wall 41 and a depending interiorly threaded skirt 42. The interior threading is used for attachment to an element of the receptacles (not shown). The ring 40 bears on the flange 37. Ribs 39 on the member 30 present an outside diameter larger than the inside diameter of the ring 40 to prevent it from slipping off.

A very important feature of the invention is the cord-grasping sleeve 50, which can be used elsewhere, for its function is useful in environments not related to the plug. It has an upper clinching portion 51 and a continuous lower annular portion 52, approximately the size of but a little larger than the cord 9. The lower portion 52 fits around the cord 9 and bears against an O-ring 53. The clinching portion 51 is preferably molded in the shape shown in FIG. 5, with a short cylindrical bore portion 54 much smaller than the cord 9 it is to grasp, with frusto-conical portions 55 and 56 on each side thereof, the portion 55 leading to the lower continuous ring 52 and the portion 56 to the opposite end. The clinching portion 51 is also provided with a series of radially extending notches 57 which stop short of the lower portion 52. Although the drawing shows four notches 57, more or fewer can be provided. The clinching portion 51 is formed to provide a pair of conical outer surfaces, an upper conical surface 58 and a lower conical surface 59, the lower conical surface 59 seating on the conical seat 34 of the intermediate member 30. The sleeve 50 may be reversed so that what has, for the sake of convenience been called "upper," may be the lower end, but the direction of installation shown and described is preferred when put on the cord 9, the portion 51 is forced out at the notches, and exerts spring pressure to resume its original shape.

The pressure cap 60 preferably has a skirtlike portion 61 with interior threads engaging the exterior threads 32 of the intermediate portion 30 and also having a conical surface 62 pressing on the upper conical surface 58 of the cord-grasping sleeve 50. The sleeve 50 is thus nearly fully enclosed, except for a flow-permitting gap 65 into a recess 66. Other tightening means may be used. The cap 60 may loosely encircle the cord 9, having an opening 63 which is not intended to grasp the cord 9 by itself. However, when the cap 60 is tightened on to the intermediate member 30 with the sleeve 50 in between these two members, the two conical surfaces 34 and 62 bear on the conical surfaces 58 and 59 and exert pressure. As a result, the portions 54 are pushed in to approximately their original shape, and firmly grasp the cord 9, deforming it and biting into it and at the same time, the end 52 is forced against the O-ring 53, forcing it tightly against both the wall 34 and the cord 9, sealing against the passage of water at that point. Ribs 64 on the cap 60 and the ribs 39 serve as hand grips when assembling and tightening the units. The sleeve 50 is molded so that its molded shape is its fully installed shape, the walls 34 and 58 and the walls 62 and 59 having exactly matching slopes. For many uses, it is advisable for the sleeve 50 to be non-metallic and for all the members 10, 30, 40, 50, and 60 to be made from an insulating material, such as polycarbonate, biting in on the cord 9 by the member 50 does not hurt but does give a firm grasp there. If used with armored cable and such, the sleeve 50 may be metal. In the present example, it preferably does not bite in far enough to come into contact with the wires or even with the inner insulation. The result is a watertight connection, when the O-ring 53 is incorporated, and the plug 8 can be handled by the cord 9 and pulled by the cord 9 without having any danger to the structure or pulling the cord 9 away. In dry-area uses, the sealing O-ring 53 is not required.

FIG. 7 shows a modified form of sleeve 150, much like the sleeve 50 and consequently numbered by corresponding members for the corresponding parts, exactly one hundred higher. For example, the sleeve 50 is suitable for both ⅜" and ⁷⁄₁₆" insulated cord, the cylindrical surface 54 then being about 0.340" in diameter; the sleeve 70 is suitable for both ½" and ⁹⁄₁₆" diameter cord, the cylindrical surface 154 then being about 0.490" in diameter. In both instances the surfaces 54 or 154 is smaller in diameter than the smallest cord with which it is to be used. In both instances, the angle between the surface 54 or 154 and the surface 55 or 155 is preferably about 10° to 20°, and with the structure shown it becomes substantially impossible to pull a cord to the left of the structure as shown in FIGS. 5 and 6, so tightly do these members clamp the cord.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A marine plug for use with an insulated cord, including in combination:

a male member having metallic prongs embedded in a generally cylindrical electrically insulating member having a depending cylindrical skirt, with wire attachment means for said prongs, an intermediate electrically insulating tubular member having means for securing it to the male member and an upper portion with an interior annular tapered seat, a cord-grasping sleeve having an upper clinching portion and lower continuous ring portion slightly larger than the size of said cord, said upper portion being molded to provide a short cylindrical portion much smaller in diameter than said cord and joined to said lower portion and to its upper end by respective frusto-conical flaring portions, divided by notch means to enable spreading apart of said upper portion during installation and having an outer tapered lower surface portion seated in and matching in slope said seat and an outer upper tapered face, and a pressure cap having means for securing it to said intermediate member and having a surface pressing on said face and tapered at the same slope,
so that when said pressure cap is tightened to said intermediate member, said cap and said tapered seat force said upper portion of said sleeve into its original as-molded position in very tight squeezing engagement with said cord, biting into said cord.

2. The marine plug of claim 1 having a sealing gasket wedged between said lower portion of said sleeve and said intermediate member and into firm sealing engagement with said cord.

3. The marine plug of claim 2 having a gasket wedged between said male member and said intermediate member to seal the joint there.

4. The marine plug of claim 1 wherein said male member has an upper extending threaded portion and said intermediate electrically insulating tubular member has a lower interiorly threaded portion for engagement with the threaded portion of the male member and an upper exteriorly threaded portion, and said pressure cap is threaded on said intermediate member, so that when said pressure cap is threaded tightly, it and said tapered seat force said upper portion of said sleeve into its very tight squeezing engagement with said cord.

5. The marine plug of claim 1 wherein said sleeve is electrically insulating plastic.

6. The marine plug of claim 1 wherein, except for said prongs and wire attachment means, the entire plug is made from electrical insulating material.

7. A device for tightly gripping cords, ropes, and the like, including in combination:
    a tubular member having an interior annular conical seat,
    a cord-grasping sleeve having an upper clinching portion and lower portion slightly larger than the size of said cord or rope, said upper portion of said sleeve being molded to provide a short cylindrical portion much smaller in diameter than said cord or rope and joined to said lower portion and to its upper end by frusto-conical portions and being divided by notch means to enable spreading apart of said upper portion for installation and having its outer surface provided with a lower conical portion seated in said conical seat and having slope identical thereto and an upper conical face,
    a pressure cap having a conical surface pressing on said face and of identical slope thereto, and
    means for urging said pressure cap and tubular member tightly together,
    so that when said pressure cap and tubular member are urged together, said upper portion of said sleeve is forced into its original as-molded position for biting into said cord or rope and giving a very tight gripping engagement with a said cord or rope.

8. The device of claim 7 having a resilient gasket wedged between said sleeve and said tubular member for sealing engagement with said cord.

9. The device of claim 7 wherein said sleeve is resilient stiff plastic.

10. The device of claim 9 wherein said tubular member and said sleeve are also plastic.

11. The device of claim 10 wherein said plastic tubular member has an upper exteriorly threaded portion and said plastic pressure cap is threaded on said tubular member.

12. The device of claim 7 for use with a variety of sizes of cords or ropes, wherein said short cylindrical portion is smaller than the smallest of said sizes and said lower portion is larger than the largest of said sizes.

References Cited

UNITED STATES PATENTS

| 2,554,585 | 5/1951 | Miller | 285—341 X |
| 2,886,090 | 5/1959 | Rosan | 151—19 X |
| 3,307,138 | 2/1967 | Swartz | 339—89 |

FOREIGN PATENTS

| 570,905 | 2/1933 | Germany. |

RICHARD E. MOORE, *Primary Examiner.*

U.S. Cl. X.R.

24—136